United States Patent Office 3,580,858
Patented May 25, 1971

3,580,858
STABLE LIQUID ANHYDRIDE COMPOSITIONS
Francis E. Evans, Hamburg, and Chao-Shing Cheng, Williamsville, N.Y., assignors to Allied Chemical Corporation, New York, N.Y.
No Drawing. Filed Feb. 8, 1968, Ser. No. 703,902
Int. Cl. C07c 63/00; C08f 45/58
U.S. Cl. 252—182
17 Claims

ABSTRACT OF THE DISCLOSURE

Novel liquid cyclic polycarboxylic acid anhydride mixtures which are stabilized against deposition of solids by incorporation of a small amount of at least one polyether polyol of more than 12 carbon atoms.

Cyclic polycarboxylic acid anhydrides are widely used as epoxy curing agents as well as intermediates in manufacturing dyes and pigments, e.g. the phthalocyanine type pigments of British Pat. 686,395. In these applications, anhydrides which are liquids at ordinary room temperature, e.g. 20–30° C., are in great demand because they are far more convenient to use and handle than solid anhydrides. In epoxy resin technology, for example, a liquid anhydride curing agent can be conveniently blended with liquid reactive epoxy resin at room temperature to give a homogeneous mixture that cures uniformly. Conversely, solid anhydrides require elevated mixing temperatures to melt the anhydrides. The necessity to employ elevated temperature not only is inconvenient, but also greatly shortens the pot life of the reactive resin thereby hindering molding or other utilization of the resin.

Since cyclic anhydrides of polycarboxylic acids are solids at room temperature, a large number of specific mixtures of two or more anhydrides, e.g. mixtures of isomeric tetrahydrophthalic acid anhydride as disclosed in U.S. patent 3,487,092 of C. S. Cheng and F. C. Boye, Ser. No. 637,090, issued Dec. 30, 1969 have been devised which are supercooled liquids at ordinary room temperature. Such metastable liquid mixtures have little or no storage stability, i.e. they solidify or deposit solids on storage for only about 5 to 10 days, especially in the presence of atmospheric moisture. Moisture hydrolyzes the anhydrides generating the corresponding carboxylic acid which, being poorly soluble in the liquid anhydride mixture, crystallizes. Even minute quantities of crystallized acid, albeit invisible to the unaided eye, can seed crystallization of the anhydride. Furthermore, the metastable liquid anhydride mixtures freeze if cooled to a sufficiently low temperature, e.g .10° to −10° C. or lower. On being warmed to room temperature, the resultant frozen solids do not liquify completely. The latter type of instability, so called "freeze-thaw" instability is a particularly serious disadvantage since it cannot be overcome by storing the liquid anhydride mixture in the absence of atmospheric moisture. To overcome the instability of liquid anhydride mixtures, the prior art has proposed addition of various stabilizers, e.g. monohydric and polyhydric alcohols as disclosed in U.S. Pat. 3,245,916, and oxirane-containing compounds as disclosed in U.S. Pat. 3,296,148. However, such prior art expedients entail troublesome use of elevated temperatures, e.g. 80° C. or higher, to prepare the stabilized mixture, require addition of excessive costly amounts of stabilizer, and/or adversely affect the properties of the anhydride mixture and the epoxy resins cured therewith.

It is an object of the present invention to provide novel stable liquid mixtures of cyclic polycarboxylic acid anhydrides.

Another object of the invention is to provide novel stabilized liquid anhydride mixtures which can be prepared at ordinary room temperatures.

These and other objects and advantages will be apparent from the following description of our invention.

In accordance with the present invention it has been discovered that liquid mixtures of polycarboxylic acid anhydrides which are stable, homogeneous liquids at ordinary temperatures (i.e., about 20° C.±10° C.); remain in homogeneous liquid condition for extended periods (i.e., about one month or more); are freeze-thaw resistance (i.e., they revert to their original homogeneous, liquid condition when solidified by freezing and rewarmed to about 20° C.); and which are especially adapted for use as curing agents for epoxy resins, can be obtained by incorporating into the normally unstable liquid mixture of organic polycarboxylic anhydrides a small but stabilizing amount of at least one polyether polyol containing at least 13 carbon atoms. (By "normally unstable liquid mixture of polycarboxylic anhydrides" is meant an anhydride mixture which is liquid at ordinary temperature but which on being solidified by freezing does not revert to its homogeneous liquid condition on being rewarmed to about 20° C. Such "normally unstable anhydrides" also will, on standing for periods of less than about one month, deposit solids and thus become heterogeneous liquid composition.)

Thus it has been discovered that by incorporating a small amount of polyether polyol containing at least 13 carbon atoms into a polycarboxylic acid anhydride mixture such as mixtures of the isomeric tetrahydrophthalic anhydrides, or tetrahydrophthalic anhydride admixed with one or more other polycarboxylic anhydrides, e.g. hexahydrophthalic anhydride, phthalic anhydride, said anhydride compositions may be converted from the normally unstable and heterogeneous compositions which are not freeze-thaw resistant to stable, homogeneous, liquid compositions which remain homogeneous and liquid for extended periods at ordinary temperatures and which after being exposed to temperatures at or below their solidification temperatures, revert to said homogeneous liquid form on being warmed to about 20° C.

Furthermore, incorporation of polyether polyols of the present invention in liquid anhydride mixtures according to the invention provides up to an 8-fold increase in the stability of the resultant mixture toward storage, even in the presence of atmospheric moisture. This result was highly surprising since liquid anhydride mixtures containing monohydric polyethers of a corresponding number of carbon atoms possess little or no storage stability, for example, a storage stability of 9 days or less as is illustrated in Example 6 below.

The novel compositions of the invention are prepared by simply mixing, advantageously with mechanical agitation, of the liquid polyol with the liquid anhydride component until a homogeneous single liquid phase system is obtained. Generally mixing is complete in about 30 to 90 minutes. The polyol and anhydride component are preferably mixed at about ordinary room temperature, i.e. 20 to 30° C., but the mixing can be carried out at any temperature above the freezing point of the liquid anhydride component. Use of elevated temperature, e.g. temperatures up to about 130° C. or higher, while effective, produces no added advantage. According to the invention anhydrides containing crystallized anhydride and/or the corresponding polycarboxylic acid can be employed as starting material, the addition of the polyol inhibits further crystallization in the resultant polyol-anhydride mixture. Preferably, however, our novel compositions are prepared from anhydride components which are substantially free of solids and/or dissolved polycarboxylic acid and liquid water. The resultant polyol-liquid anhydride mixtures exhibit improved freeze-thaw stability as compared to the corresponding polyol-free mixtures. Removal of solids, acid and water can be achieved by distillation of the anhydride component or other conventional purification technique. An especially good purification is obtained by treating the anhydride component in accordance with the process of our copending U.S. patent application, Ser. No. 703,866, filed of even date herewith, entitled "Stable Liquid Dicarboxylic Acid Anhydride Compositions." In accordance with the procedure disclosed therein, the anhydride is purified by incorporation of a small amount of an organic isocyanate or carbodiimide and the mixture is distilled to recover the purified anhydride as distillate.

The amount of polyether polyol required to stabilize liquid mixtures of anhydrides according to the invention will vary over a broad range depending on the particular anhydride mixture and polyether polyol employed. In general, as little as about 0.001% (based on the weight of the anhydride component) provides effective stabilization. Preferably, we employ about .01 to 5%, and especially about .05 to 2% by weight of polyol based on the anhydride component. Use of 10% or more of the polyether polyol, while effective, provides no added advantage.

The cyclic polycarboxylic acid anhydrides which are employed in the novel liquid compositions of the invention are derivatives of a single molecule or polycarboxylic acid in which the anhydride functional group constitutes a heterocyclic nuclei. They comprise anhydrides derived from heterocyclic, iso-cyclic, and open chain saturated or unsaturated aliphatic polycarboxylic acids as well as isocyclic and heterocyclic aromatic polycarboxylic acids which contain at least two vicinal carboxylic acid groups. They also include cyclic anhydrides derived from polycarboxylic acids having two or more such sets of vicinal carboxylic acid groups. Typical anhydrides suitable for use in the present invention include aliphatic cyclic polybasic anhydrides, such as maleic anhydride, succinic anhydride, dodecenylsuccinic anhydride, chlorosuccinic anhydride, chloro maleic anhydride, dioctylsuccinic anhydride, nonadecadienylsuccinic anhydride, and the like; aromatic cyclic polybasic anhydrides such as trimellitic anhydride, phthalic anhydride, and the like; cycloaliphatic cyclic polybasic polycarboxylic anhydrides such as $\Delta^1$, $\Delta^2$, $\Delta^3$ and $\Delta^4$-tetrahydrophthalic anhydride, hexahydrophthalic anhydride, dihydrophthalic anhydride, as well as the anhydrides derived from such polycarboxylic acids as 6-ethyl-4-cyclohexene-1,2-dicarboxylic acid, 3, 6-dimethyl-4-cyclohexene-1,2-dicarboxylic acid, 6-butyl-3,5-cyclohexadiene-1,2-dicarboxylic acid, 3-methyl-1,2,3, 6-tetrahydrophthalic acid, bicyclo[2,2,1]hept-5-ene-2,3-dicarboxylic acid, methylbicyclo[2,2,1]hept-5-ene-2,3-dicarboxylic acid, and the like. In general, the anhydrides employable herein may contain from about 4 to 25 carbon atoms but preferably contain from aobut 4 to 17 carbon atoms.

As the anhydride component of the present novel compositions we employ a mixture of two or more of the above or equivalent anhydrides in the proportions prescribed by the prior art for producing an anhydride mixture which is liquid at room temperature or lower, e.g. in the proportions disclosed in U.S. Pats. 3,245,916, 3,296,148, 3,078,235 and 3,487,092.

Preferably, liquid anhydride mixtures containing hexahydrophthalic acid anhydride and/or two or more isomeric tetrahydrophthalic acid anhydrides are employed. An especially good result is achieved according to the invention in stabilizing a mixture of 1-, 2-, 3- and 4-cyclohexene-1,2-dicarboxylic acid hereafter referred to as $\Delta^1$, $\Delta^2$, $\Delta^3$ and $\Delta^4$-tetrahydrophthalic acid anhydrides, respectively, of the type disclosed in aforementioned U.S. Pat. 3,487,092.

The polyether polyols employed as stabilizers according to our invention are a known class of liquid polyhydroxyl compounds widely employed in the manufacture of urethane polymers.

The polyether polyols suitable in the practice of the present invention contain at least 13 carbon atoms and correspond to the formula

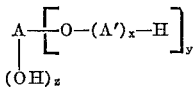

wherein A is the residue of an organic polyol containing from 2 to 14 carbon atoms, A' is a 2-alkyleneoxy group, containing from 2 to 14 carbon atoms preferably containing from 2 to 4 carbon atoms, $x$ and $y$ are each integers of from 1–35 with the proviso that the sum of $x$ and $y$ is at least 3, $z$ is an integer of from 0–9 with the proviso that the sum of $y$ and $z$ is at least 2. Polyether polyols corresponding to the above formula are well known materials and are described in the prior art literature, e.g. U.S. Pats. 2,902,478 and 2,927,918. They are the reaction product of an epoxide, e.g. an alkylene oxide such as ethylene oxide, propylene oxide, styrene oxide, 2,3-butylene oxide and the like, and a polyhydroxy organic compound, e.g. ethylene glycol, 1,2-propylene glycol, 1,3-propylene glycol, styrene glycol, trimethylol propane, resorcinol, 1,2,6 - hexanetriol, pentaerythritol, $\alpha$ - methyl glucose, sorbitol, sucrose and the like. Conveniently a mixture of polyether polyols (the usual commercially available form of such compounds) is used. Preferably, aliphatic polyether polyols are employed as stabilizers. Polyether polyols having as few as two hydroxyl groups per molecule, i.e. which have a functionality of two and as many as 10 or more hydroxyl groups per molecule can be employed as stabilizers according to the invention. Preferably, we employ polyether polyols having a functionality of about 4 to 8. The polyether polyol charged as stabilizer according to the invention should contain more than 12 carbon atoms per molecule and preferably about 15 to 60 carbon atoms. Polyether polyols containing as many as 105 or more carbon atoms per molecule are effective as stabilizers according to the invention but are not in general readily available. An especially preferred polyether polyol is the reaction product of propylene oxide, glycerol and sucrose having an average functionality of 5. The stabilization mechanism operating in our novel compositions is not known with certainty. However, it is believed that at least a portion of the polyether polyol reacts with the anhydrides to generate polyether polyol esters of the corresponding polycarboxylic acids which removes free carboxyl groups from the anhydride composition.

The present invention provides novel stabilized cyclic polycarboxylic acid anhydride mixtures which can be prepared at room temperature and which remain homogeneous liquids in the presence of atmospheric moisture from about 2 to 8 times longer than the corresponding unstabilized liquid mixtures. Preferred compositions of the invention which are prepared from substantially water-, acid- and solids-free liquid anhydride mixtures obtained as described in our copending application referred to above exhibit improved freeze-thaw stability compared to the corresponding unstabilized liquid anhydride compositions.

In addition to being stable, the liquid anhydride mixtures of our invention are readily miscible with epoxy resins at or near ordinary room temperature. Hence, the incorporation of the stabilized liquid composition is accomplished simply and without application of heat. This is not only a more convenient operation than addition of hot molten anhydrides but also results in a considerable extension of the working life of the reactive resin-anhydride compositions as compared to epoxy resins which are cured with the corresponding solid anhydrides charged at elevated temperature.

The small stabilizing amounts of polyether polyols charged to the anhydride mixture in accordance with the invention do not impair its ability to cure epoxy resins. Epoxy resins cured with our novel stabilized anhydride compositions have properties, e.g. high distortion temperatures, comparable in excellence to the properties obtained when the same resins are cured with the same anhydrides to which the stabilizing agent(s) have not been added.

In the following examples which illustrate our invention, parts, percentages and proportions are by weight unless otherwise indicated, and temperatures are in degrees centigrade.

EXAMPLE 1

Part A

A liquid mixture of the $\Delta^1$, $\Delta^2$, $\Delta^3$, and $\Delta^4$ isomers of tetraphthalic acid anhydride*, prepared in accordance with the process of U.S. patent application Ser. No. 637,090 and treated with 1% (based on the anhydride mixture) of a toluene diisocyanate distillation residue substantially as described in experiment 4 of Table II of U.S. patent application of Cheng and Evans, Ser. No. 703,866, filed of even date herewith, is agitated for about one hour at ambient temperature with about 0.2% (based on the anhydride mixture) of a polyether polyol mixture (average functionality 5; hydroxyl number 460) which is the reaction product of 1,2-propylene oxide and a mixture containing about 23.7% glycerol and about 76.3% sucrose (containing about 4 to 5 molar proportions of epoxide condensed with each molar proportion of glycerol and about 11 to 12 molar proportions of epoxide condensed with each molar proportion of sucrose). The resulting homogeneous solution is stored in a sealed glass vessel under air at ambient temperature and pressure. After 28 days storage in the presence of the atmospheric moisture, the mixture becomes turbid indicating the precipitation of solid.

Part B

Repetition of the procedure of Part A above, omitting addition of the polyether polyol, provides an anhydride mixture which precipitates solid after storage for only eight days in the presence of atmospheric moisture.

EXAMPLE 2

Part A

The procedure of Example 1, Part A is repeated omitting the diisocyanate residue treatment of the anhydride mixture but employing anhydride mixture which has been freshly distilled in vacuo to remove any carboxylic acid as in experiment 1 of Example 18 of U.S. patent application of Cheng and Evans, Ser. No. 703,866. The resultant homogeneous solution precipitates solid after storage for 14 days in the presence of atmospheric moisture.

Part B

The procedure of Part A above is repeated omitting the addition of the polyether polyol. The resultant solution precipitates solid after storage for only five days in the presence of atmospheric moisture.

EXAMPLE 3

The procedure of Example 1, Part A is repeated substantially as described except that the anhydride mixture employed is treated with 2% toluene diisocyanate still residue (based on the anhydride mixture) instead of 1% as in Example 1 and the amount of the polyether polyol is varied as indicated in experiments A, B and C of Table I below:

TABLE I

| | Percent polyether polyol charged (based on anhydride mixture) | Storage stability toward atmospheric moisture (days) |
| --- | --- | --- |
| A | 0.05 | >70 |
| B | 0.1 | >70 |
| C | 0.25 | >70 |

The following example illustrates use of a linear polyether polyol additive in the compositions of the invention.

A mixture of isomeric tetrahydrophthalic acid anhydrides similar to that charged in Example 3 is admixed with 0.2% (based on the anhydride mixture) of a linear polyether polyol (average functionality 2, hydroxyl number 110; containing about 16 molar proportions of 1,2-propylene oxide condensed with each molar proportion of 1,2-propylene glycol) following the procedure of Example 1, Part A. The resultant homogeneous solution becomes turbid after storage for 25 days in the presence of atmospheric moisture under the conditions employed in Example 1.

EXAMPLE 5

The following example illustrates the stability of a polyol-anhydride mixture of the invention toward repeated freezings and thawings.

Part A

A tetrahydrophthalic acid anhydride mixture (containing about the same proportions of isomeric anhydrides as that of Example 1, Part A) is treated with 1% di-o-tolylcarbodiimide substantially in accordance with the procedure of experiments 2 and 3 of Table II of U.S. patent application of Cheng and Evans, Ser. No. 703,866. The resulting substantially water-, solids-, and acid-free anhydride mixture is admixed according to the procedure of Example 1, Part A with 0.25% of a polyether polyol mixture (average functionality 5; hydroxyl number 530) which is the reaction product of 1,2-propylene oxide and a mixture of 33% glycerol and 67% sucrose (containing about 3 to 4 molar proportions of epoxide condensed with each molar proportion of glycerol and about 9 to 10 molar proportions of epoxide condensed with each molar proportion of sucrose). The resultant homogeneous solution is maintained under an atmosphere of nitrogen at 3° for about 16 to 20 hours. The resultant frozen solid is then allowed to stand at ambient temperature (about 25°) for about 7 to 8 hours. The resultant melt is then examined for solids. This completed one freeze-thaw cycle. No solids are observed even after the solution has been subjected to nine repetitions, i.e. a total of 10 cycles, of this cycle.

Part B

In a comparative experiment the process of Part A above is repeated substantially as described omitting the addition of the polyether polyol. The anhydride mixture becomes turbid during the tenth freeze-thaw cycle.

A comparison of the results of Parts A and B above illustrates the improvement in stability of a polyol-anhydride mixture of the invention toward repeated freezings and thawings compared to the stability of a corresponding polyol-free anhydride composition.

EXAMPLE 6

The following comparative example illustrates the instability of liquid anhydride compositions containing monohydric polyether alcohols toward freezing and thawing and toward atmospheric moisture.

Part A

One-hundred parts of a liquid mixture containing 80% hexahydrophthalic acid anhydride and 20% $\Delta^4$-tetrahydrophthalic acid anhydride is heated at 121° for 6 hours

---

*Present in the approximate percentage amounts: $\Delta^1$ isomer, 42.4%, $\Delta^2$ isomer, 14.4%, $\Delta^3$ isomer, 34.7% and $\Delta^4$ isomer, 8.7%.

with one part of Triton X-100 (a polyethoxy ethanol which is derived from an isooctyl phenol and which contains about 9 to 10 molar proportions of ethylene oxide combined with each molar proportion of the phenol; Rohm and Haas Co.). The resultant homogeneous solution is frozen by being cooled to $-10°$ and is maintained at the latter temperature for about 19 hours. On being warmed to ambient temperature (ca. 25°), the mixture remains solid.

Part B

The procedure of Part A above is repeated substantially as described except that 100 parts of a mixture containing 75% hexahydrophthalic anhydride and 25% dodecenyl succinic acid anhydride is charged as the liquid anhydride mixture. On being warmed from $-10°$ to ambient temperature, the frozen anhydride-polyether alcohol mixture thaws providing a homogeneous liquid. The liquid mixture is stored at ambient temperature in the presence of atmospheric moisture according to the procedure of Example 1, Part A. The mixture becomes turbid after only nine days storage.

The invention has been described and illustrated with reference to specific embodiments thereof. It will be obvious to those skilled in the art that variations in the details set out in these specific examples can be made without departing from the scope and spirit of the invention.

We claim:
1. A stable homogeneous composition of matter which is a liquid at a temperature of about 10 to 30° C. consisting essentially of a liquid mixture of at least two organic cyclic polycarboxylic acid anhydrides which mixture is normally heterogeneous at least after being subjected to a freeze-thaw cycle and a small stabilizing amount of a polyether polyol having at least 13 carbon atoms, said polyether polyol stabilizer corresponding to the formula

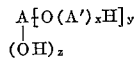

wherein A is the residue of an organic polyol containing from 2 to 14 carbon atoms, A' is a 2-alkyleneoxy group containing from 2 to 14 carbon atoms, $x$ and $y$ are each integers of from 1-35 with the proviso that the sum of $x$ and $y$ is at least 3, $z$ is an integer of from 0-9 with the proviso that the sum of $y$ and $z$ is at least 2.

2. The composition as defined in claim 1 wherein said polyether polyol stabilizer is present in an amount at least 0.001 percent, by weight of said mixture of anhydrides.

3. The composition as defined in claim 2 wherein A' is an alkyleneoxy group containing from 2 to 4 carbon atoms.

4. The composition as defined in claim 1 wherein said polyether polyol has between about 15 and 60 carbon atoms and a functionality between about 4 and 8.

5. The composition as defined in claim 2 wherein the polyether polyol stabilizer is a mixture of a polyether polyol wherein A is the residue of glycerol and A' is a 2-propyleneoxy group and a polyether group wherein A is the residue of sucrose and A' is a 2-propyleneoxy group said mixture having an average functionality of about 5.

6. The composition as defined in claim 1 wherein said mixture of polycarboxylic acid anhydrides is a mixture of isomeric tetrahydrophthalic acid anhydrides.

7. The composition as defined in claim 1 wherein said mixture of polycarboxylic acid anhydrides is a mixture of isomeric tetrahydrophthalic anhydrides with phthalic anhydride, hexahydrophthalic anhydride or dodecenylsuccinic anhydride.

8. The composition as defined in claim 2 wherein said polyether polyol stabilizer is present in amount between about 0.05 and 2.0 percent, by weight of said mixture of anhydrides.

9. A process for the preparation of a stable, liquid organic polycarboxylic anhydride mixture composition which comprises incorporating in a liquid mixture of at least two organic cyclic polycarboxylic acid anhydrides, which mixture is normally heterogeneous at least after being subjected to a freeze-thaw cycle, from about 0.001 to 10 percent, by weight of the anhydride mixture, of a liquid polyether polyol having at least 13 carbon atoms corresponding to the formula

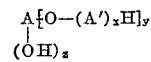

wherein A is the residue of an organic polyol containing from 2 to 14 carbon atoms, A' is a 2-alkyleneoxy group containing from 2 to 14 carbon atoms, $x$ and $y$ are each integers of from 1 to 35 with the proviso that the sum of $x$ and $y$ is at least 3, $z$ is an integer of from 0-9 with the proviso that the sum of $y$ and $z$ is at least 2.

10. The process as defined in claim 9 wherein A' is an alkyleneoxy group containing from 2 to 4 carbon atoms.

11. The process as defined in claim 9 wherein said polyether polyol has between about 15 and 60 carbon atoms and a functionality between about 4 and 8.

12. The process as defined in claim 10 wherein said polyether polyol is a mixture of a polyether polyol wherein A is the residue of glycerol and A' is a 2-propyleneoxy group and a polyether polyol wherein A is the residue of sucrose and A' is a 2-propyleneoxy group said mixture having an average functionality of about 5.

13. The process as defined in claim 9 wherein said mixture of polycarboxylic acid anhydrides is a mixture of isomeric tetrahydrophthalic acid anhydrides.

14. The process as defined in claim 9 wherein said mixture of polycarboxylic acid anhydrides is a mixture of isomeric tetrahydrophthalic anhydrides with phthalic anhydride, hexahydrophthalic anhydride or dodecenylsuccinic anhydride.

15. The process as defined in claim 9 wherein said polyether polyol stabilizer is incorporated in an amount between about 0.05 and 2.0 percent by weight of said mixture of anhydrides.

16. The process as defined in claim 9 wherein, prior to incorporation of said polyether polyol stabilizer, said organic polycarboxylic anhydride mixture is purified by distillation to produce an anhydride mixture which is substantially free of solids, dissolved polycarboxylic acid, or liquid water.

17. The process as defined in claim 16 wherein said purification is effected by the steps comprising (1) admixing said mixture of polycarboxylic acid anhydrides with at least about 0.1 percent, by weight of said mixture of anhydrides of a treating agent selected from the group consisting of an organic isocyanate and an organic carbodiimide and (2) distilling the resultant mixture to recover as a distillate fraction a liquid polycarboxylic acid anhydride mixture.

References Cited
UNITED STATES PATENTS

| | | | |
|---|---|---|---|
| 3,078,235 | 2/1963 | Bowman et al. | 252—182 |
| 3,190,925 | 6/1965 | Stowe | 252—407 |
| 3,245,916 | 4/1966 | Woskow | 252—182 |
| 3,247,125 | 4/1966 | Woskow | 252—182 |
| 3,341,555 | 9/1967 | Wooster et al. | 260—346.3 |
| 3,470,214 | 9/1969 | Young | 260—346.3 |

RICHARD D. LOVERING, Primary Examiner

I. GLUCK, Assistant Examiner

U.S. Cl. X.R.

252—407; 260—2, 18, 47, 346.3